United States Patent [19]

Henderson, Jr. et al.

[11] 4,013,620

[45] Mar. 22, 1977

[54] STABILIZATION OF RUBBER WITH NICKEL COMPLEXES OF THIOBIS(p-ALKYLPHENOLS)

[75] Inventors: William Arthur Henderson, Jr., Stamford; Arnold Zweig, Westport, both of Conn.

[73] Assignee: American Cyanamid Company, Stamford, Conn.

[22] Filed: Jan. 17, 1972

[21] Appl. No.: 218,132

[52] U.S. Cl. .................. 260/880 R; 260/45.75 N
[51] Int. Cl.² ........................................ C08K 5/37
[58] Field of Search .......... 260/810, 814, 45.75 N, 260/880

[56] References Cited

UNITED STATES PATENTS

| 2,380,299 | 7/1945 | Evans et al. | 260/45.75 |
| 2,971,940 | 2/1961 | Fuchsman et al. | 260/45.75 |
| 3,052,636 | 9/1962 | Strobel et al. | 260/45.85 |
| 3,215,717 | 11/1965 | Foster | 260/45.75 |
| 3,415,875 | 12/1968 | Luethi et al. | 260/45.75 |
| 3,636,023 | 1/1972 | Murray et al. | 260/45.75 |

OTHER PUBLICATIONS

Rubber Chemistry and Technology, vol. 39, No. 3, June, 1966, pp. 537–552; article by Morand.

*Primary Examiner*—V. P. Hoke
*Attorney, Agent, or Firm*—Frank M. Van Riet

[57] ABSTRACT

Rubber stabilized against the deleterious effects of oxidation with stabilizing amounts of nickel complexes of 2,2'-thiobis(p-alkylphenols) and a method therefor, are disclosed.

12 Claims, 1 Drawing Figure

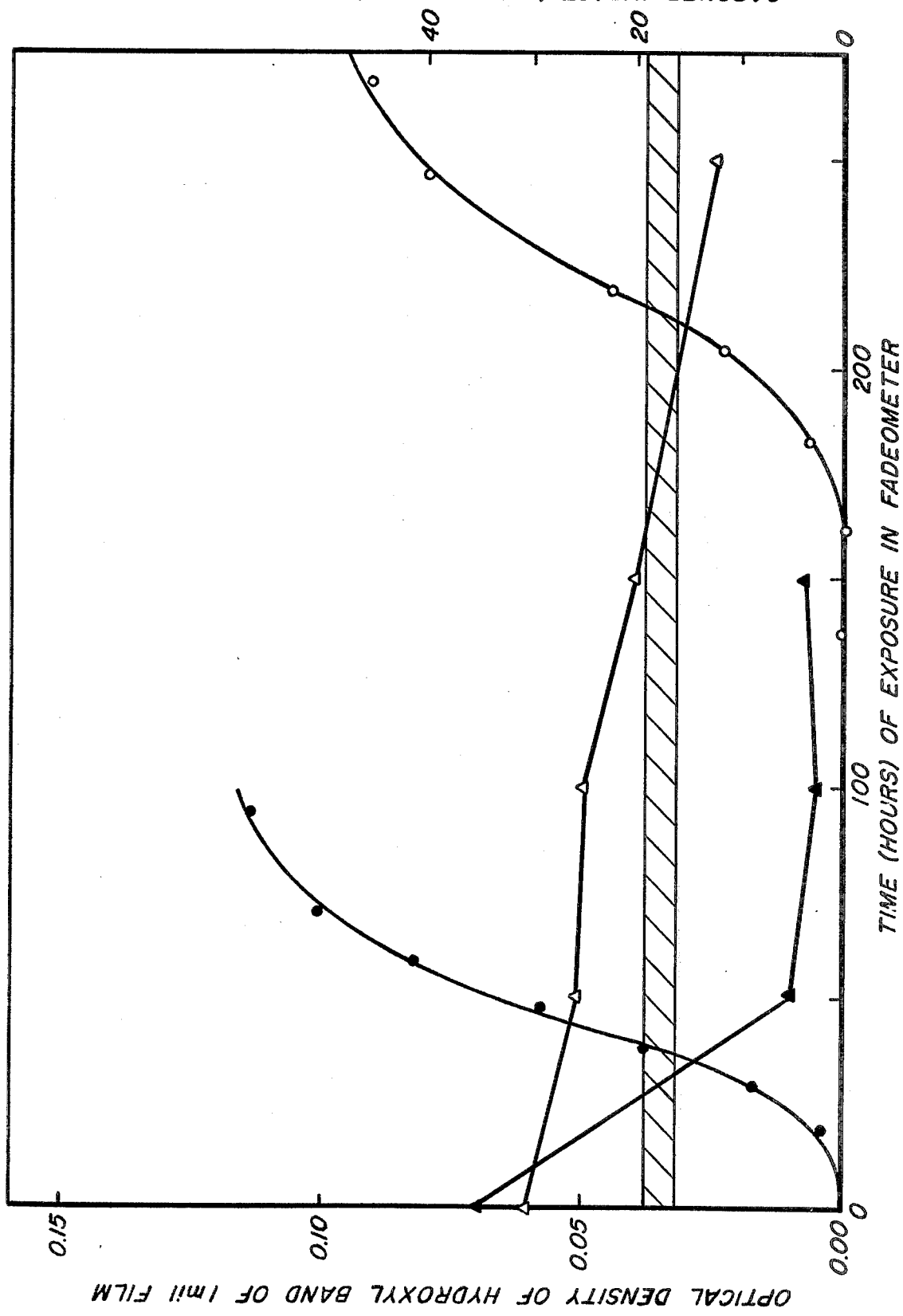

STABILIZATION OF RUBBER WITH NICKEL COMPLEXES OF THIOBIS(p-ALKYLPHENOLS)

BACKGROUND OF THE INVENTION

This invention pertains to the art of stabilization and more particularly, involves the photostabilization of rubber and rubber modified polymers e.g. impact polymers, against the oxidative deterioration thereof. The stabilization of the rubber is accomplished by incorporating therein a stabilizing amount of a nickel complex of a 2,2'-thiobis(p-alkylphenol).

The stabilization of rubber and rubber modified polymers has become of increasing concern in recent years due to the application of such polymers to exterior uses. Furthermore, with the advent of very clear, transparent, impact systems, color stability has become increasingly important and the need for substantially colorless stabilizers, of course, has increased proportionately.

Many different types of stabilizers have heretofore been exploited commercially for use as additives for rubber and rubber modified polymers but they have either been relatively ineffective over long periods of time or they have been of such disagreeable color that they have not been commercially accepted by the plastics industry.

SUMMARY

We have now discovered that a class of stabilizers, previously found useful in the stabilization of olefin polymers, has the ability to protect rubber and rubber modified polymers from the deleterious effects of heat and/or ultraviolet light, etc. i.e. oxidation. These known stabilizers effect, on the average, a several fold improvement in the photostable lifetime of the rubber systems while industrially recommended additives, at best, afford, on the average, less then about a two fold improvement.

While the stabilizers used herein have known efficiency in the stabilization of olefin polymers, it is completely unexpected that they would also so function in rubber and rubber modified systems, especially in view of the failure of other known and commercially available polyolefin stabilizers to vastly improve the stability of such systems.

The novel compositions of the present invention find use in such applications as boats, toys, garden equipment, sporting goods, carrying cases, electrical appliances, automobile parts and the like.

BRIEF DESCRIPTION OF THE DRAWING

The drawing depicts a graphic representation of a 1 mil film and a 40 mil sheet of an acrylic impact polymer both with and without the addition of 1% of 2,2'-thiobis(p-t-octylphenyl)n-butylamine nickel complex. The curves drawn from points indicated as open and solid circles ○ and ● denote the increase in optical density of the hydroxy band with time of the stabilized and unstabilized film, respectively, while those indicated as open and solid triangles △ and ▲ show the Gardner impact strength values of the stabilized and unstabilized sheet, respectively. The cross-hatched area depicts that range of optical densities below which the films did not crack on flexing and above which they did.

DESCRIPTION OF THE INVENTION INCLUDING PREFERRED EMBODIMENTS

The instant invention is directed to compositions of matter comprising a rubber which is normally subject to deterioration by oxidation such as that caused by ultraviolet light, containing, as an inhibitor against said deterioration, a stabilizing concentration of a nickel complex of a 2,2'-thiobis-(p-alkylphenol) wherein the other complex forming ligand (A) is water, ammonia or an aliphatic or aromatic primary, secondary or tertiary amine and said alkyl group contains from about 1–18 carbon atoms, inclusive, said complex being characterized by a single ligand (A) to nickel coordinate bond and a single nickel to sulfur coordinate bond for each nickel atom in the complex molecule.

The nickel complexes of 2,2'-thiobis(p-alkylphenols) useful herein have the formula

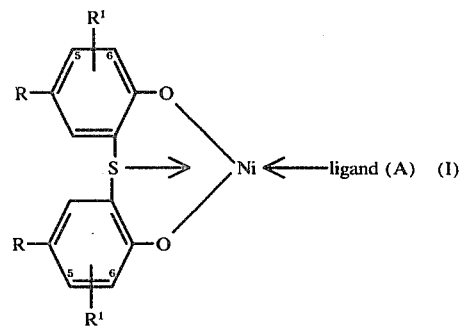

wherein R is an alkyl group of 1–18 carbon atoms, inclusive, $R^1$ is hydrogen or an alkyl group of 1–18 carbon atoms, inclusive, and is positioned at the 5 or 6 position of the ring, and the ligand (A) is as set forth hereinabove. These useful stabilizers and methods for their production are set forth in U.S. Pat. Nos. 3,215,717; 3,218,294; 3,313,770; 3,379,680, which patents are also hereby incorporated herein by reference.

The rubber and rubber modified polymer systems which are stabilized according to the present invention are well known to those skilled in the art and any of such systems may be used herein.

Generally, we have found that any rubber which contains at least 5%, by weight, based on the total weight thereof, of repeating unsaturated hydrocarbon units therein may be stabilized according to our invention. Such materials include natural rubber such as hevea, gutta percha etc. and the like. More particularly, butadiene rubbers which comprise at least 5%, by weight, based on the total weight thereof, of a butadiene fall within the scope of materials which may be stabilized as described herein. Examples of suitable butadiene rubbers include homopolymers and copolymers of such butadienes as butadiene per se, isoprene, piperylene, 2-alkylbutadienes, dimethylbutadienes, 1-cyanobutadiene and the like. Comonomers which may be copolymerized with the butadienes, singly or in combination of two or more, include styrene, acrylonitrile, vinyltoluene, substituted styrenes such as dichlorostyrene, methylphenyl vinyl ketone, methylphenyl isopropenyl ketone, methyl methacrylate, ethyl acrylate, acrylic acid, methacrylic acid, sorbic acid, cinnamic acid, 2-vinylpyridine etc. and other comonomers known to those skilled in the art. A preferred class of rubbers, preferred because of the general commercial availability are those mentioned above and based primarily on butadiene per se as the unsaturated hydrocarbon unit imparting component.

As mentioned above, the instant invention is also directed to the stabilization of rubber modified compositions, i.e. impact polymer systems wherein any of the above individual rubber species are utilized as impact increasing additives to polymeric materials. That is to say, the natural rubbers, the rubbers based on a butadiene and butadiene rubbers per se may be added to hard, resinous polymers in order to increase the impact resistance thereof and the resultant compositions may also be stabilized according to the instant invention.

These impact polymers are generally produced by blending together, such as with a Banbury mixer, a thermoplastic polymer, preferably a vinyl polymer, and the above-described rubber, in amounts such that the final compositions contain from about 1% to about 75%, by weight, of the rubber. The polymers are also oftimes produced by the interpolymerization of the thermoplastic e.g. vinyl monomers in the presence of the rubber under conditions well defined in the art.

More specific examples of rubber modified polymer systems useful herein include the high impact styrenes i.e. homopolymers and copolymers of styrene, with such monomers as acrylonitrile etc., blended with or polymerized in the presence of butadiene polymers including polybutadiene, butadienestyrene copolymers, butadiene-acrylonitrile copolymers, butadiene-styrene-acrylonitirle terpolymers etc.; ABS-type polymers which are blends of copolymers of styrene and acrylonitrile with styrene-acrylonitrile-polybutadiene grafted rubbers and the like; the high impact acrylics such as homopolymers of such acrylic monomers as methyl methacrylate, ethyl acrylate etc. and copolymers thereof with themselves or with such comonomers as styrene, acrylonitrile etc. blended with or interpolymerized in the presence of rubbery copolymers such as butadienestyrene, polybutadiene, isoprene, etc. e.g. those disclosed in U.S. Pat. No. 3,354,238, hereby incorporated herein by reference; rubber modified vinyl chloride polymers such as polyvinyl chloride containing butadiene-styrene copolymers and the like. Further examples of useful impact polymers can be found in U.S. Pat. Nos. 2,802,808; 3,472,813; 3,261,887; 2,857,360; 3,009,895; 3,029,223, which patents are also incorporated herein by reference.

The method of protecting said rubber and rubber modified polymers whereby said nickel complexes are incorporated into the materials in stabilizing amounts also falls within the scope of the instant invention.

The stabilizers may be incorporated into the rubbers by any conventional method such as by (1) dissolving the nickel complex and the rubber or rubber modified polymer in a suitable solvent and evaporating the solvent, (2) by mechanically mixing the components such as on a two-roll mill, (3) extrusion compounding, interpolymerization in the presence of the nickel complex and the like, the particular method employed in forming the blends forming no part of the instant invention.

The stabilizers are incorporated into the rubber and rubber modified polymers in stabilizing concentrations which generally range from about 0.01% to about 10.0%, preferably from about 0.5% to about 4.0%, by weight, based on the weight of the rubber per se or the rubber modified polymer. The stabilizers are effective in that they not only prevent oxidative degradation due to ultraviolet light or heat but impart very little color to the compositions, remain compatible with the material to which they are added and do not detract from the other desired properties of the basic materials i.e. high impact etc.

The nickel complexes may be utilized alone or in admixture with one another and even in conjunction with conventional additives such as soaps, anti-static agents, pigments, dyes, fillers and the like, without detracting from the scope of the present invention.

In the preparation of 1 mil test films below, stock solutions of polymers are made up by dissolving the polymer component in a solvent. An appropriate amount of additive is then dissolved in the polymer solution. The solution is then poured onto a flat glass plate and spread with a Gardner knife so as to give a ten mil film of the solution. The solvent is allowed to evaporate at room temperature leaving a 1 mil film of dried polymer, which is peeled from the glass plate and used for subsequent testing.

In the preparation of the 40 mil specimens, sheets are prepared by mixing, on a two-roll mill at 340° F, the appropriate parts of additive and parts of the polymer component. Mixing is continued for five minutes, after which the composition is ground to pass a ¼ inch screen. The composition is then extruded using a Killion extruder through a die at 40 mil at a temperature of 400° F. Exposure tests, accelerated weathering and photodegradation studies, are carried out by exposing the film or sheet samples in a xenon arc Fade-Ometer, run without water spray but close to 100% humidity. The 1 mil film samples are removed periodically from the Fade-Ometer and the infrared spectrum taken. The increase in the optical density in the OH region of the spectrum is measured and taken as representative of the amount of hydroperoxide decomposition products formed. We have found that for a given polymer, the size of the OH peak corresponds very closely with the failure point (embrittlement point) of the polymer films, as measured by their ability to survive manual folding and creasing without cracking. All films are subjected to a simple flexing test wherein the film is folded 180° and creased between thumb and finger. The film is considered to have failed when the sample cracks along the crease. The times measured to the embrittlement point, as determined by the above two tests, correspond closely with times measured to a significant decrease in impact strength of 40 mil sheet, as described more fully below.

The 40 mil sheet samples are exposed as above and then subjected to the Gardner impact test, wherein the samples are found to either survive or fail (by cracking) impact by a falling weight. The number of inch pounds of impact just needed to crack the sample is determined from the average of a number (five or ten) of trials. Results are determined in inch pounds per mil of sheet thickness or as inch pounds for a given thickness.

Most of the testing is done spectroscopically. In the case of ABS-type polymers, the size of the hydroxyl and the carbonyl bands in the infrared spectrum is followed, Hirai et al; Japan Plastics; Vol 4; pgs. 22–32; 1970. The photodegradation of such unsaturated polymers is believed to proceed in the following manner: A. M. Trozzolo et al; Macromolecules, 1, 98 (1968); M. L. Kaplan et al; Polymer Science, 8, 3163 (1970). Trace amounts of light absorbing materials, ketones etc., absorb light. The energy of the absorbed light causes reaction of the polymer double bonds with oxygen to produce, initially, unsaturated hydroperoxides. These are in turn degraded by absorbed light and decompose to form, inter alia, ketones and alcohols. At the same time, reaction occurs within and between the polymer chains to cross-link them. Either process leads to severe deterioration of the impact properties of the polymer sample and, consequently, rapid failure of the polymer in impact resistance. The ketonic and other degradation products initially formed are also light absorbers, and lead to rapidly accelerated, massive failure of the polymer.

Hence, in ABS-type polymers, the hydroxyl band begins to increase rapidly after an induction period of some hours, and shortly thereafter, the carbonyl band begins to increase as well. The initially formed hydroxyl band is, in large part, due to hydroperoxide, although as reaction proceeds, more and more of it is due to simple alcoholic hydroxyl.

A large number (30 or more) of samples of each ABS-type polymer were followed by the infrared method and identical samples were simultaneously subjected to the flexing test. We found that, no matter what the time was to failure in the flexing test as a result of the additives in the samples, failure occurred at that time when the sizes of the hydroxyl and carbonyl peaks were passing through a very narrow range of values. That is, a very definite amount of peroxide or carbonyl formed in the polymer and coincided with the failure point of the polymer sample. As mentioned above, the results by these two methods parallel closely the results utilizing the 40 mil sheets.

The size of either the hydroxyl or the carbonyl peak is therefore a good indicator of the failure point of the polymer, see U.S. Pat. Nos. 3,208,968; 3,216,919. The size of the hydroxyl or carbonyl peak at the failure point differs slightly for different ABS polymers, presumably because of differences in composition and structure of the polymers.

A slightly modified approach is followed in regard to acrylic polymers. These polymers usually contain significant amounts of acrylate monomers, the carbonyl band of which completely masks that of carbonyl photodegradation products in the infrared. Here, the hydroxylic peak is followed as an indication of the effect of additives on these polymers. Again, the size of the hydroxyl peak at the failure point falls within a very narrow range, and the results of these spectroscopic test are similar to the results of impact tests in 40 mil sheets.

In the drawing, the FIGURE shows the relationship between the length of time of exposure of samples in the Fade-Ometer and the results by the three test methods described. The curves depicted by open and closed circles show the rate of increase in optical density of the hydroxyl band with time. The range of optical densities denoted by the cross-hatched rectangular portion of the graph is that below which samples did not crack in the flexing test and above which the same samples failed. It is to be noted that because the optical density curves are steeply rising at the failure point, the time at which failure occurs is very precisely defined. The curves depicted by open and closed triangles show the Gardner impact strength of 40 mil sheet samples exposed for the same periods of time. Curves represented by closed circles and triangles are for samples without additive. Curves represented by open circles and triangles are for samples stabilized with 1% of 2,2'-thiobis(p-octylphenyl)n-butylamine nickel. It should be noted that the closed curves fail in the flexing test and loose one half of their impact strength (considered as failed) at about the same times, as do the open curves. The polymer in each instance is that of Example 1.

The following examples are set forth for purposes of illustration only and are not to be construed as limitations on the present invention except as set forth in the appended claims. All parts and percentages are by weight unless otherwise specified. In each example, the rubber or rubber modified polymer contains at least 5%, by weight, of unsaturated hydrocarbon units.

EXAMPLE 1

To a suitable vessel are charged 99 parts of a polymer comprising a blend of (1) polybutadiene grafted with methyl methacrylate, styrene and acrylonitrile and (2) a terpolymer of said monomers, having a butadiene, styrene, acrylonitrile and methyl methacrylate content of 12%, 18%, 8% and 61%, respectively, in 900 parts of toluene. One part of 2,2'-thiobis(p-t-octylphenyl)n-butylamine nickel complex is then added with stirring. The resultant solution is then coated onto a glass plate with a Gardner blade at a film thickness of 10 mils. After evaporation of solvent at room temperature, a 1 mil film is recovered and tested as described above.

The results of the test and others wherein substituent R and the ligand (A) of Formula I, above, of the nickel complexes are varied according to the instant invention, are set forth in Table I, below, $\Delta_{OD}$=optical density. In Tables III and IV, C=comparative example.

TABLE I

| Ex. | NICKEL COMPLEX | | | Time (hrs.) to obtain $\Delta_{OD}$ of about 0.035 (failure) |
|---|---|---|---|---|
| | R | R¹ | Ligand (A) | |
| Control | — | — | — | 45 |
| 1 | t-octyl | H | n-butylamine | 213 |
| 2 | " | " | water | 210 |
| 3 | " | " | ammonia | 170 |
| 4 | " | " | ethylamine | 187 |
| 5 | " | " | n-propylamine | 182 |
| 6 | " | " | phenylamine | 142 |
| 7 | " | " | cyclohexylamine | 185 |
| 8 | " | " | n-dodecylamine | 150 |
| 9 | " | " | tris(2-hydroxyethyl)amine | 195 |
| 10 | " | " | bis(2-hydroxyethyl)cyclohexylamine | 86 |
| 11 | stearyl | H | n-butylamine | 146 |
| 12 | CH₃ | 5-CH₃ | water | 116 |
| 13 | " | " | ethylamine | 93 |
| 14 | " | " | n-butylamine | 85 |
| 15 | " | " | cyclohexylamine | 90 |
| 16 | " | " | n-dodecylamine | 115 |
| 17 | " | " | bis(n-dodecyl)amine | 112 |
| 18 | C₂H₅ | 6-C₂H₅ | ammonia | 116 |
| 19 | t-octyl | H | triphenylamine | 101 |
| 20 | CH₃ | 5-stearyl | n-butylamine | 120 |
| 21 | n-dodecyl | H | diphenylamine | 98 |
| 22 | t-amyl | 5-t-amyl | tris(n-butyl)amine | 127 |
| 23 | t-octyl | 5-ethyl | ammonia | 118 |
| 24 | " | H | bis(n-dodecyl)amine | 109 |
| 25 | " | " | p-hydroxyphenylamine | 95 |

The procedure of Example 1 is again followed except that various other commercially available rubber-modified polymers are utilized therein. The results are set forth below in Table II. In Examples 49–54, the percentages refer to the total concentration of complex in the polymer.

TABLE II

| Ex. | NICKEL COMPLEX R | R¹ | Ligand (A) | obtain $\Delta_{OD}$ of: Polymer | Time (hrs.) to 0.050 | 0.020 |
|---|---|---|---|---|---|---|
| 26 | t-octyl | H | n-butylamine | 33% butadiene; 26% methyl methacrylate; 28% styrene; 14% acrylonitrile polymerization product | 130 | — |
| 27 | " | " | p-phenylamine | " | 106 | — |
| 28 | " | " | cyclohexylamine | " | 117 | — |
| 29 | " | " | n-dodecylamine | " | 105 | — |
| 30 | " | " | bis(2-hydroxyethyl) cyclohexylamine | " | 101 | — |
| 31 | CH₃ | 5-CH₃ | n-butylamine | " | 91 | — |
| 32 | " | " | cyclohexylamine | " | 101 | — |
| 33 | " | " | n-dodecylamine | " | 91 | — |
| 34 | stearyl | H | n-butylamine | " | 100 | — |
| Control | — | — | — | " | 30 | — |
| 35 | t-octyl | H | n-butylamine | polymerization product of 28% butadiene; 53% styrene and 19% acrylonitrile | — | 79 |
| 36 | " | " | p-phenylamine | " | — | 54 |
| 37 | t-octyl | H | cyclohexylamine | polymerization product of 28% butadiene; 53% styrene and 19% acrylonitrile | — | 63 |
| 38 | " | " | n-dodecylamine | " | — | 66 |
| 39 | " | " | bis(2-hydroxyethyl) cyclohexylamine | " | — | 79 |
| 40 | stearyl | " | n-butylamine | " | — | 64 |
| 41 | CH₃ | 5-CH₃ | " | " | — | 58 |
| 42 | " | " | cyclohexylamine | " | — | 61 |
| 43 | " | " | n-dodecylamine | " | — | 60 |
| Control | — | — | — | " | — | 40 |
| 44 | t-octyl | H | n-butylamine | polymerization product of 12% butadiene; 73% styrene and 18% acrylonitrile | — | $\Delta_{OD}$=0.035 160 |
| Control | — | — | — | " | — | 25 |
| 45 | t-octyl | H | n-butylamine | polymerization product of 17% butadiene, 69% styrene and 14% acrylonitrile | — | 85 |
| Control | — | — | — | " | — | 40 |
| 46 | t-octyl | H | n-butylamine | commercially available impact polystyrene containing 75% styrene and 25% butadiene | — | $\Delta_{OD}$=0.040 115 |
| Control | — | — | — | " | — | 34 |
| Control | — | — | — | Same as Example 1 | $\Delta_{OD}$=0.035 34 | — |
| 47 | t-octyl | H | dibutylamine | " | 153 | — |
| 48 | " | " | piperidine | " | 128 | — |
| 49 | " | " | n-butylamine-0.1% | " | 49 | — |
| 50 | " | " | n-butylamine-0.2% | " | 58 | — |
| 51 | t-octyl | H | n-butylamine-0.5% | Same as Example 1 | 111 | — |
| 52 | " | " | n-butylamine-2.0% | " | 350 | — |
| 53 | " | " | n-butylamine-4.0% | " | 665 | — |
| 54 | " | " | n-butylamine-8.0% | " | 1300 | — |

EXAMPLES 55–67

The procedure of Example 1 is again followed except that different materials are stabilized according to the instant invention. The stabilizer is that used in Example 1 and the concentration thereof in the material is 1.5%, based on the weight of the material. The materials are (55) natural hevea rubber; (56) natural hevea rubber grafted with 30% of methyl methacrylate; (57) a copolymer of isoprene and acrylonitrile (67/33); (58) a butadiene-methyl methacrylate copolymer (85/15); (59) a butadiene-acrylic acid copolymer (90/10); (60) a butadiene-2-vinylpyridine copolymer (95/5); (61) a homopolymer of piperylene; (62) polybutadiene; (63) polyisoprene; (64) a 2-ethylbutadiene-styrene copolymer (70/30); (65) the copolymer of Ex. 57 blended with polymethyl methacrylate (10/90); (66) styrene and acrylonitrile (10/10) interpolymerized in the presence of polyisoprene; and (67) the copolymer of Ex. 59 blended with polyvinyl chloride. In each instance, the resistance of the stabilized material is greater than the control sample tested without any oxidative degradation additive.

EXAMPLE 68

To the polymer of Example 1 is added 1.0 part of 2,2'-thiobis(p-t-octylphenyl)n-butylamine nickel complex as described therein. The resultant composition is heated to 185° C until significant decomposition occurs. The stabilized sample withstands said heat for 7500 seconds while an unstabilized sample fails in 3500 seconds.

Again following the procedure of Example 1, the polymer thereof is blended with varying amounts of commercially available polyolefin additives for purposes of comparison thereof with those of the instant invention and the blends are then tested as described above. The results are set forth in Table III, below.

TABLE III

| Ex. | Additive | Conc. % | Time (hrs.) to $\Delta_{OD}$ of 0.035 |
|---|---|---|---|
| Control | — | — | 38 |
| 69C | 2,4,6-tris(3,5-di-t-butyl-4-hydroxybenzyl)mesitylene | 0.5 | 51 |
| 70C | tris[alkyl($C_9$—$C_{12}$)phenyl]phosphite | 0.5 | 39 |
| 71C | 2'-hydroxy-4'-methyldodecanophenone, oxime nickel II | 0.5 | 88 |
| 72C | o-(N-dodecylformimidoyl)phenol, nickel II | 0.5 | 68 |
| 73 | 2,2'-thiobis(p-t-octylphenol)n-butylamine nickel complex | 0.5 | 125 |
| Control | — | — | 33 |
| 74C | Same as Ex. 71 | 0.5 | 97 |
| 75 | Same as Ex. 73 | 0.5 | 120 |
| 76C | 2,2'-[ethylenebis(nitrilodecylidyne)]di-p-cresol nickel II | 0.5 | 50 |
| 77C | 2-hydroxy-5-methylbenzophenone nickel II | 0.5 | 67 |
| 78C | Dithiobenzil nickel II | 0.5 | 43 |
| Control | — | — | 43 |
| 79C | o-(N-sec-butylformimidoyl)phenol nickel II | 0.5 | 63 |
| 80C | N,N'-ethylenebis(4-imino-2-penten-2-ol) nickel II | 0.5 | 67 |
| 81C | o-(N-dodecylformimidoyl)phenol, copper II | 0.5 | 11 |
| 82C | Ethyl 3,5-di-t-butyl-4-hydroxybenzyl-phosphonate nickel II | 0.5 | 92 |
| 83C | 2,2'-thiobis[4-(1,1,3,3-tetramethyl-butyl)phenol], nickel II | 0.5 | 92 |
| 84 | Same as Ex. 73 | 0.5 | 150 |
| Control | — | — | 35 |
| 85C | Same as Ex. 71 | 1.0 | 117 |
| 86 | Same as Ex. 73 | 1.0 | 225 |
| 87C | 2-hydroxy-4-octylbenzophenone | 0.5 | 52 |
| 88C | p-octylphenylsalicylate | 0.5 | 44 |
| 89C | 5-hydroxy-2-methyl-4-hexen-3-one nickel II | 0.5 | 52 |
| 90C | Dicyclohexylphosphinodithioic acid cobalt II | 0.5 | 48 |
| 91C | N-butyldithiocarbamate nickel II | 0.5 | 65 |
| Control | — | — | 36 |
| 92C | Same as Ex. 72 | 1.0 | 48 |
| 93C | o-(N-dodecylformimidoyl)phenol, cobalt II | 1.0 | 11 |
| 94C | Same as Ex. 93 - copper II | 1.0 | 15 |
| 95C | o-[N-(p-anilinophenyl)formimidoyl] | 1.0 | 77 |
| 96C | o-formimidoylphenol nickel II | 1.0 | 14 |
| 97C | o-formimidoylphenol cobalt II | 1.0 | 13 |
| 98C | o-formimidoylphenol copper II | 1.0 | 72 |
| Control | — | — | 43 |
| 99C | 3,5-Diisopropylsalicylic acid nickel II | 1.0 | 10 |
| 100C | 3,5-Diisopropylsalicylic acid cobalt II | 1.0 | 10 |
| 101C | 3,5-Diisopropylsalicylic acid copper II | 1.0 | 37 |
| Control | — | — | 43 |
| 102C | Salicylaldehyde, oxime nickel II | 1.0 | 73 |
| 103C | 3-methoxysalicylaldehyde, oxime, nickel II | 1.0 | Insoluble |
| 104 | Same as Ex. 73 | 1.0 | 295 |
| 105C | Same as Ex. 87 | 1.0 | 58 |
| 106C | Same as Ex. 88 | 1.0 | 51 |
| 107C | 2'-hydroxyacetophenone, oxime nickel II | 1.0 | 97 |
| 108C | Same as Ex. 105 | 2.0 | 80 |
| Control | — | — | 54 |
| 115 | Same as Ex. 73 | 1.0 | 295 |
| 116C | 2,2'-thiobis(p-t-octylphenol)n-butylamine cobalt complex | 1.0 | 15 |
| Control | — | — | 40 |
| 117C | nickel acetonylacetonate | 1.0 | 70 |
| 118C | 2,2'-methylenebis(6-t-butyl-p-cresol) | 1.0 | 72 |
| 119C | 2,4-Di-t-butylphenyl 3,5-di-t-butyl-4-hydroxybenzoate | 1.0 | 77 |

To a two-roll mill heated to 340° F are added 990 parts of the polymer of Example 1 and 10 parts of 2,2'-thiobis(p-t-octylphenyl)n-butylamine nickel complex. The components are allowed to admix for about 5 minutes and the resultant product is then ground sufficiently to pass a ¼ inch screen. The composition is extruded into a sheet of 40 mil thickness which is then utilized as a specimen in the testing method disclosed hereinabove. The results of this example as well as those of additional specimens prepared using different polymers are set forth in Table IV, below. $T_{1/2}$ represents the time in hours for the composition to lose ½ of its original impact strength.

TABLE IV

| Ex. | Additive | Polymers | Conc. % | $T_{1/2}$ (hrs.) |
| --- | --- | --- | --- | --- |
| 120 | 2,2'-thiobis(p-t-octylphenyl)-n-butylamine nickel complex | Same as Ex. 1 | 1.0 | 210 |
| Control | — | " | — | 33 |
| 121C | Same as Ex. 71 | " | 1.0 | 150* |
| 122 | Same as Ex. 9 | " | 1.0 | 180 |
| Control | — | Same as Ex. 26 | — | 57 |
| 123 | Same as Ex. 120 | " | 1.0 | 165 |

*very dark color

We claim:

1. A composition comprising (1) a styrene, acrylic or vinyl chloride polymer modified with from about 1–75% of a grafted or ungrafted rubber, said rubber containing at least 5%, by weight, based on the total weight thereof, of repeating unsaturated hydrocarbon units and being normally subject to deterioration by oxidation, having incorporated therein, as an inhibitor against said deterioration, (2) a stabilizing concentration of a nickel complex of a 2,2'-thiobis-(p-alkylphenol) wherein the complex forming ligand (A) is water, ammonia or an aliphatic or aromatic primary, secondary or tertiary amine and said alkyl group has from 1–18 carbon atoms, inclusive, said complex being characterized by a single ligand (A) to nickel coordinate bond and a single nickel to sulfur coordinate bond for each nickel atom in the complex molecule.

2. A composition according to claim 1 wherein said (1) comprises an acrylic copolymer modified with a grafted polybutadiene.

3. A composition according to claim 1 wherein said (1) is an acrylonitrile-styrene copolymer modified with a grafted polybutadiene.

4. A composition according to claim 1 wherein said (1) comprises a styrene polymer modified with a grafted polybutadiene.

5. A composition according to claim 1 wherein said (1) is an acrylonitrile-styrene-methyl methacrylate copolymer modified with a grafted polybutadiene.

6. A composition according to claim 1 wherein said alkyl group is a t-octyl group and said ligand (A) is n-butylamine.

7. A composition according to claim 2 wherein said alkyl group is a t-octyl group and said ligand (A) is n-butylamine.

8. A composition according to claim 3 wherein said alkyl group is a t-octyl group and said ligand (A) is n-butylamine.

9. A composition according to claim 1 wherein said (1) is polystyrene containing an impact modifying amount of rubber.

10. A composition according to claim 9 wherein said alkyl group is a t-octyl group and said ligand (A) is n-butylamine.

11. A method of inhibiting the oxidative degradation of a styrene, acrylic or vinyl chloride polymer modified with from about 1–75% of a grafted or ungrafted rubber, wherein said rubber contains at least 5%, by weight, based on the total weight thereof, of repeating unsaturated hydrocarbon units which comprises incorporating therein a stabilizing concentration of a nickel complex of a 2,2'-thiobis (p-alkylphenol) wherein the complex forming ligand (A) is water, ammonia or an aliphatic or aromatic primary, secondary or tertiary amine and said alkyl group has from 1–18 carbon atoms, inclusive, said complex being characterized by a single ligand (A) to nickel coordinate bond and a single nickel to sulfur coordinate bond for each nickel atom in the complex molecule.

12. A method according to claim 11 wherein said rubber modified polymer comprises a methyl methacrylate-styrene-acrylonitrile copolymer modified with a grafted polybutadiene, said alkyl group is a t-octyl group and said ligand (A) is n-butylamine.

* * * * *